Figure 1:
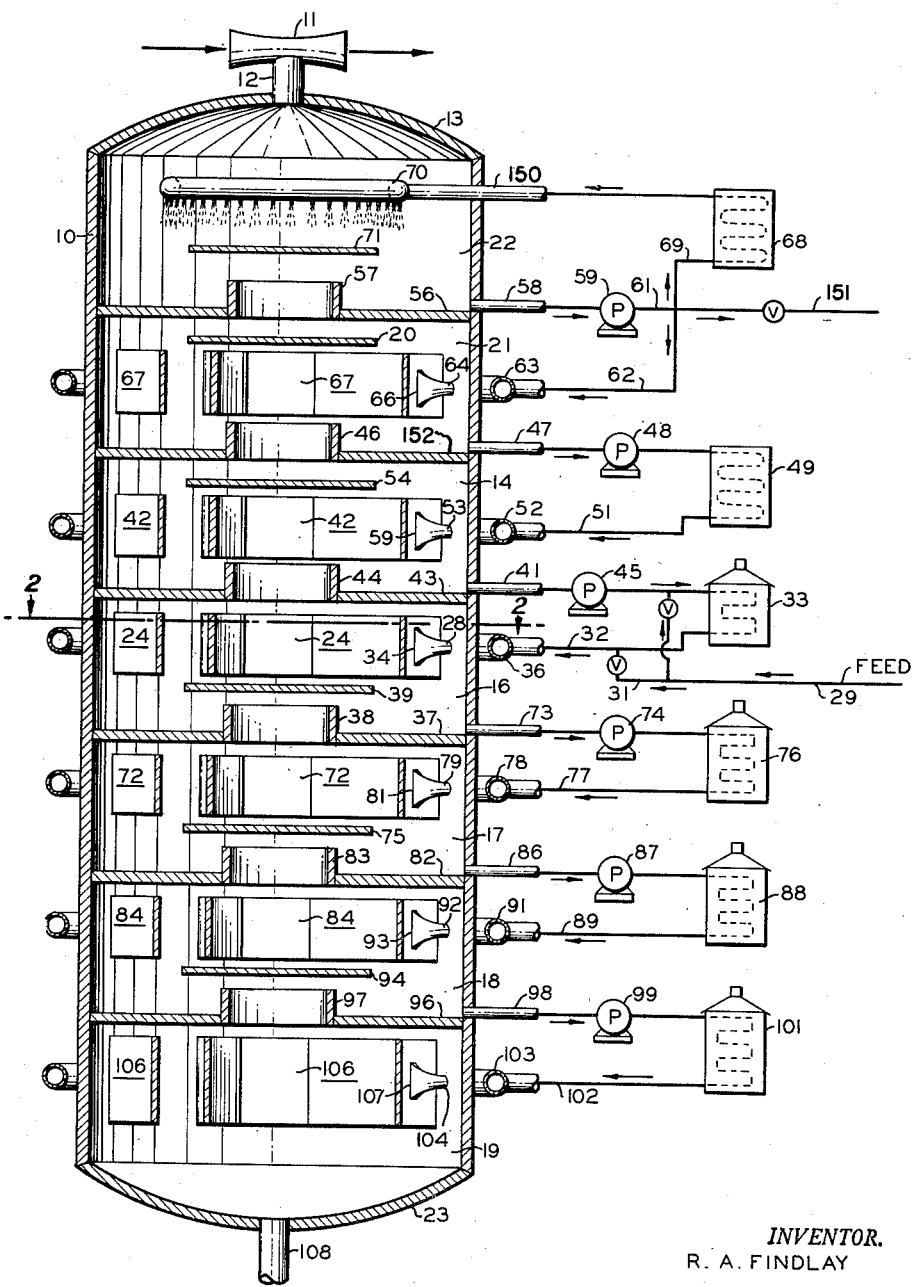

Dec. 28, 1954 R. A. FINDLAY 2,698,282
VACUUM DISTILLATION OF OILS
Filed Dec. 21, 1950 2 Sheets-Sheet 1

INVENTOR.
R. A. FINDLAY
BY Hudson and Young
ATTORNEYS

Dec. 28, 1954   R. A. FINDLAY   2,698,282
VACUUM DISTILLATION OF OILS
Filed Dec. 21, 1950   2 Sheets-Sheet 2

INVENTOR.
R. A. FINDLAY
BY
Hudson and Young
ATTORNEYS

United States Patent Office 2,698,282
Patented Dec. 28, 1954

2,698,282

VACUUM DISTILLATION OF OILS

Robert A. Findlay, Bartlesville, Okla., assignor to Phillips Petroleum Company, a corporation of Delaware Application December 21, 1950, Serial No. 202,041

4 Claims. (Cl. 196—77)

This invention relates to the vacuum distillation of oils. One embodiment of this invention relates to the flash vaporization of residual oils to produce vapors freed of entrained liquids. Another embodiment of this invention relates to the separation of a petroleum residuum into a residual liquid fraction having a high carbon residue, and a clear distillate fraction freed from heavy asphaltic materials and having utility as a feed stock in numerous oil conversion processes.

Heretofore in the vacuum distillation of residual oils, distillate fractions having high carbon residues have been obtained. The distillate fractions thus recovered are "dirty," that is, they are high carbon residue oils containing heavy carbonaceous materials present as a result of the entrainment of such materials in the vapors during the distillation. Entrainment of this kind is inherent in all flash vaporization operations, particularly with heavy oils, a small portion of the unvaporized material being entrained in the flashed vapors as small finely divided liquid droplets, often appearing as a "fog" or a mist. Such an entrainment of finely divided liquid droplets is typical of that also occurring during conventional vacuum distillation operations. In such conventional processes the entrained liquid is carried on through the distillation system and is recovered in the distillate fractions, thereby contributing to the high carbon residues so typical of those recovered distillates.

These entrained fog-like materials must be removed from the vapor containing them in order that "clean" distillate fractions, i. e., of low carbon residue, be recovered. The recovered distillate fractions also have greater utility as feed stocks in various conversion processes when freed of such heavy asphaltic materials.

My invention is concerned with the flash vaporization of oil residua, particularly crude petroleum residua, residua from topped crude recycle cracking operations, fuel oils, and the like, in a manner to provide vapors freed of entrained heavy liquid carbonaceous materials, and further with the vacuum distillation of such oils employing such a flash vaporization in conjunction with additional fractionation of the vapors so-produced, to provide a clean clear high-quality distillate and a residual liquid of high carbon residue. In accordance with my invention such a residual oil is treated so as to concentrate virtually all of its asphaltic constituents, minerals, salt and the like, in the residual high carbon residue product fraction, i. e., the distillation bottoms, thus providing a clean overhead distillate product freed from such heavy residual materials.

An object of my invention is to provide a process and apparatus for the distillation of residual oils. Another object is to provide for the flash vaporization of oils to recover a residual liquid fraction having a high carbon residue, and vapors freed from entrained liquids. Another object is to provide for the separation by vacuum distillation of a residual petroleum oil into a high-quality distillate having utility in various applications as a hydrocarbon conversion feed stock, and a distillation bottoms product having a high carbon residue. Another object is to provide apparatus for conducting the fractionation of residual hydrocarbon oils under high vacuum, wherein the flow of vapors formed, through the apparatus, is unobstructed by conventional packing material, a liquid layer, or the like. Another object is to provide for the distillation of residual hydrocarbon oils at an absolute pressure below 1 mm. Hg. Other objects will be apparent to those skilled in the art in the light of the accompanying drawings and disclosure.

In accordance with my invention I have provided apparatus and process for distilling heavy oils, as for example a topped petroleum crude, a residual product from topped crude cracking, a fuel oil, or the like, to produce high-quality distillates substantially free of carbonaceous materials, and a residual distillation product, or bottoms, in which are concentrated all the mineral and salt components of the oil treated, and virtually all the asphaltic constituents thereof. My invention provides for high-quality distillates, which distillates are to be distinguished from those produced by conventional vacuum distillation methods, the latter containing heavy carbonaceous materials as a result of their entrainment in the vapors during the distillation, the presence of which reduces the utility of the gas oil distillate thus obtained inasmuch as such high carbon residue distillates are undesirable for further conversion to more valuable hydrocarbons.

In accordance with one embodiment of the process of my invention, a residual oil is introduced into a central or first section, of an upright elongated distillation zone maintained under a sub-atmospheric pressure, as low as 0.1 mm. Hg. absolute, as a plurality of wide shallow streams tangentially against a plurality of vertically disposed surfaces curved in a common inwardly direction so as to initially spread the liquid as a downwardly moving thin film on the surfaces. In this manner vaporization of the liquid takes place, and it is urged on the curved surfaces by centrifugal force, and liquid droplets emitted from the film are re-collected on the surface so that the oil is flash vaporized to form vapors containing a minimum of entrained liquid. Remaining unvaporized feed descends on the surfaces to a lower portion of the central section. Unvaporized liquid containing heavy asphaltic constituents is withdrawn from the central section, heated to a higher temperature, and then introduced into a second section in the distillation zone subjacent the central section, along a plurality of similarly disposed surfaces whereby a further flash vaporization takes place, to further reduce the liquid and provide additional vapors freed of entrained liquids. The residual liquid is withdrawn from the subjacent second section as a residual fraction of high carbon residue, and vapors freed of entrained liquids are formed in a maximum yield. Such a subjacent flash vaporization section provides for further reduction of the residual liquid from the central section. Vapors are passed from the subjacent section described, upwardly into and through the central section from an outer extremity in each of these sections along the curved surfaces to a central upper portion thereof. In this manner vapors leaving each section are caused to move in a swirling motion, and to thereby be further freed by centrifugal force of entrained liquid that may still be present. Total swirling vapors are passed upwardly from a central upper portion of the central section, into a lower portion of a third section of the distillation zone adjacent and above the central section. A cool condensate described hereafter is introduced into an upper portion of the third section as a plurality of wide shallow streams tangentially against a plurality of surfaces therein of the type present in the central portion. In this manner the cooled liquid maintains the temperature of the surfaces lower than that of the vapors introduced from the central section. Total vapors introduced into the third section are passed upwardly from a lower central portion thereof toward an upper outer extremity along the curved surfaces, whereby the upwardly flowing vapors contact the downwardly moving cooler liquid on the cool curved surfaces in countercurrent flow relation, causing fractionation to take place, i. e., causing heavy fractions of the vapor to condense and lighter fractions of the liquid to vaporize. Total condensate is withdrawn from the lowermost portion of the third section, heated and returned to the central section together with the feed stream, to be further reduced. Total vapors are passed from the third section into an uppermost or fourth section of the distillation zone in heat exchange relation with a cooled liquid condensate described hereafter so as to bring about total condensation of the vapors. Total condensate is withdrawn from the fourth section and divided into three portions, one which is further cooled and returned as the heat exchange liquid in the fourth section, another which is returned as the cooled condensate, generally without supplemental cooling, into the upper portion of the third section already discussed, and the third which is recovered as a high-quality distillate product of the process. Residual high carbon residue liquid is withdrawn from the lowermost subjacent section in the distillation zone as a product of the process.

Although in my preferred embodiment I have described a distillation zone limited to a central section, a subjacent flash vaporization section, an upper fractionation section and an upper condensation section, it is to be understood that additional fractionation sections and additional flash vaporization sections can be employed so as to carry on the distillation of the oil residuum material to any further extent desired.

Figure 2:
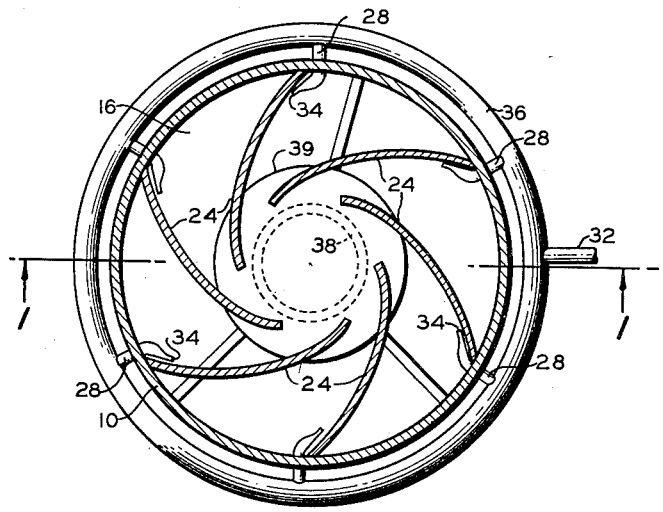
Figure 4:
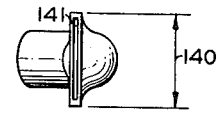
Figure 3:
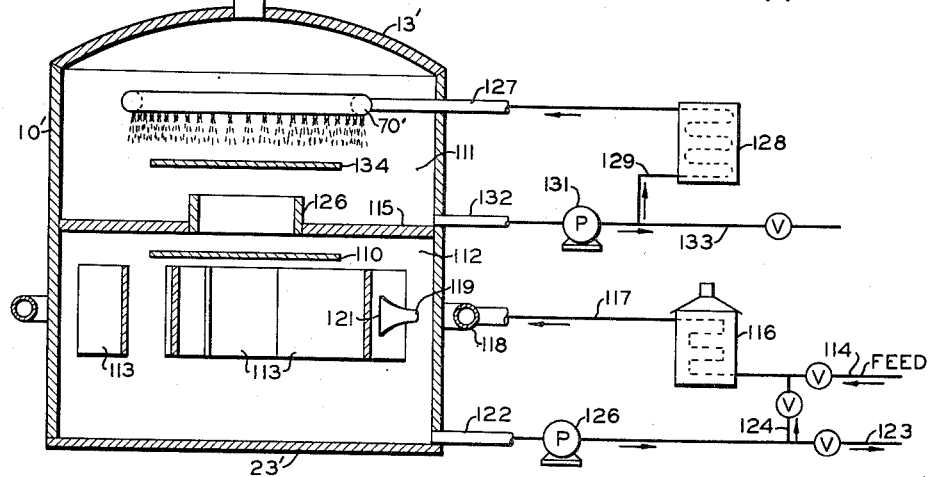

My invention is further described and illustrated with reference to the attached drawings. Figure 1 is a combined diagrammatic flow sheet, and an elevation in cross section of a preferred form of an upright vacuum distillation apparatus of my invention. Figure 2 is a cross sectional plan view of a baffle section in the apparatus of Figure 1 taken along the line 2—2. Figure 3 is a combined diagrammatic flow sheet and elevation in cross section of apparatus of another embodiment of my invention in which a residual oil is flash vaporized to produce a residual high carbon residue fraction, and a high-quality condensate of the type discussed above. Figure 4 is an elevational detail view of one form of nozzle used in the apparatus of my invention. It is to be understood that the figures are diagrammatic only and may be altered in many respects by those skilled in the art and yet remain within the intended scope of the invention.

Referring to Figure 1, upright closed elongated chamber 10, preferably cylindrical, is adapted to be maintained under sub-atmospheric pressure by vacuum producing means 11 comprising, as for example, a system of vacuum jets well known in the art, in communication with the interior of chamber 10 through conduit 12 in the top end 13. Chamber 10 is divided into a plurality of transversely extending sections, 14, 16, 17, 18, 19, 21, and 22, preferably of about the same size.

Section 16, intermediate the closed ends 13 and 23 of chamber 10, contains a plurality of vertically disposed baffles 24, in a central portion thereof, each being curved in a common direction and extending laterally from points on the periphery of chamber 10 toward the interior of section 16 so that the inner surface of each baffle 24 is closer to the chamber axis than its outer surface. A plurality of feed inlet conduits 28 in a side wall of chamber 10 are connected through header 36 with feed inlet conduit 29 via line 31 or via conduit 32 and heater 33. Nozzles 34 are each connected with a separate feed inlet conduit 28. Each nozzle 34 is adapted to admit feed tangentially from conduit 28 onto the inner surface of a separate baffle 34 as a wide shallow stream so as to cause admitted liquid to immediately spread as a film over the baffle. Partition 37 in chamber 10 transversely closes same and forms a bottom side of section 16 and a top side of section 17. Chimney conduit 38 is disposed in partition 37 and extends upward therefrom and is coaxial with chamber 10. Horizontal baffle 39 is disposed in section 16 subjacent the baffles therein and extends over chimney conduit 38.

Conduit 41 in a side wall of chamber 10 is in communication with a lower portion of section 14 immediately adjacent and above section 16 and communicates with the interior of an upper portion of section 16 through pump 45, heater 33, conduit 32, header 36, feed inlet conduits 28 and nozzles 34 connected therewith. Vertical baffles 42 are positioned in section 14 in a manner similar to the position of baffles 24 in section 16, i. e., the vertically disposed baffles 42 occupy a central portion of section 14 and are curved inwardly in a common direction and extend laterally from points on a periphery of chamber 10 toward the interior of section 14 so that the inner surface of each baffle 42 is closer to the chamber axis than its outer surface. Partition 43 in chamber 10 transversely closes same and forms a top side of section 16 and a bottom side of section 14. Chimney conduit 44 extends through partition 43 and upward therefrom and is coaxial with chamber 10.

Section 21 is positioned in chamber 10 above and adjacent section 14. Partition 152 transversely closes chamber 10 and forms a top side of section 14 and a bottom side of section 21. Chimney conduit 46 in partition 152 extends upward therefrom into section 21, and is coaxial with chamber 10. Conduit 47 in a side wall of chamber 10 is in communication with a lowermost portion of section 21 and an uppermost portion of section 14 through pump 48, cooler 49, conduit 51, header 52 disposed about section 14, and inlet conduits 53 extending through a side wall of chamber 10 and communicating with the interior of section 14. Nozzles 59 are connected to header 52 via conduits 53 and are adapted to deliver liquid from header 52 as a plurality of wide shallow streams each tangentially upon separate curved surfaces 42. Horizontal baffle member 54 in section 14 is positioned subjacent chimney 46 and extends over the concentric cylinder in section 14 formed as already described.

Uppermost section 22 in chamber 10 is above and adjacent section 21. Partition 56 transversely closing chamber 10 forms a bottom side of section 22 and closed end 13 of chamber 10 forms a top side thereof. Chimney conduit 57 extends through partition 56 upwardly into section 22 and is coaxial with chamber 10. Conduit 58 in a side wall of chamber 10 is in communication with a lowermost portion of section 22 and with an uppermost portion of section 21 via pump 59, conduits 61 and 62, header 63, conduits 64 disposed in a side wall of chamber 10, and nozzles 66. Each nozzle 66 is connected with a separate conduit 64 to admit liquid therefrom tangentially onto a separate curved baffle 67 as a wide shallow stream in the manner described with respect to nozzles and baffles in each of the sections already described. Curved baffles 67 are similar to those in other sections previously discussed, i. e., they are vertically disposed and occupy a central portion of section 21, they are curved in a common inward direction, and they extend laterally from points on the periphery of chamber 10 toward the interior of section 21 so that the inner surface of each baffle 67 is closer to the chamber axis than its outer surface. Conduit 150 extends through a side wall of chamber 10 and is connected with a spray nozzle means 70 disposed in an upper portion of section 22. Conduit 150 communicates with conduit 58 and pump 59 via cooler 68 and conduits 69 and 61. Spray means 70 is adapted to dispense cool liquid as a spray in a downward direction in section 22 so as to contact relatively hot vapors to form condensate. Although I have illustrated this form of condensing means it is to be understood that other condensing systems may be used as desired, such as heat exchange coils or the like. Horizontal baffle 71 is positioned in section 22 intermediate spray means 68 and chimney conduit 57 and extends over conduit 57. Conduit 151 is in communication with the lowermost portion of section 22 via conduit 61, pump 59, and conduit 58.

Section 17 is positioned in distillation zone subjacent section 16 and contains curved baffles 72, each vertically disposed and occupying a central portion of section 17. Baffles 72 in section 17, curved in a common direction, extend laterally from points on the periphery of chamber 10 toward the interior of section 17, so that the inner surface of each baffle 72 is closer to the chamber axis than its outer surface. Conduit 73 is in communication with a lower portion of section 16 and an upper portion of section 17 via pump 74, heater 76, conduit 77, header 78, and inlet conduits 79 in a side wall of chamber 10. Nozzles 81 in section 17 are each connected with separate conduits 79 and are each adapted to admit liquid from a conduit 79 tangentially onto the inner surface of a separate baffle 72 as a wide shallow stream. Partition 82 transversely closes chamber 10 and forms a bottom side of section 17 and a top side of section 18 described hereafter. Chimney conduit 83 in partition 82 extends upwardly into section 17 and is coaxial with chamber 10. Vertically disposed curved baffles 84 are positioned in a central portion of section 18 and are curved inwardly in a common direction extending from points on the periphery of chamber 10 toward the interior of section 18 so that the inner surface of each baffle 84 is closer to the chamber axis than its outer surface. Conduit 86 in a side wall of chamber 10 is in communication with a lowermost portion of section 17 and an uppermost portion of section 18 via pump 87, heater 88, conduit 89, header 91, and conduits 92 in a side wall of chamber 10. Nozzles 93 in section 18 are each connected with separate conduits 92 and are each adapted to admit liquid tangentially onto the inner surface of a separate baffle 84 as a wide shallow stream. Horizontal baffle 75 is disposed in section 17 intermediate the curved baffles therein and chimney conduit 83 and extends over chimney conduit 83. Partition 96 transversely closes chamber 10 and forms a bottom side of section 18 and a top side of lowermost section 19. Chimney conduit 97 extends through partition 96 upwardly into section 18 and is coaxial with chamber 10. Horizontal baffle member 94 is positioned in section 18 intermediate the curved baffles therein and chimney conduit 97 and extends over conduit 97.

Conduit 98 in a side wall of chamber 10 communicates with a lowermost portion of section 18 and with an upper portion of section 19 via pump 99, heater 101, conduit 102, header 103, and inlet conduits 104 in a side wall of chamber 10. Vertically disposed baffles 106 occupy a central portion of section 19 of chamber 10 and are curved in a common direction toward the interior of section 19 from points on the periphery of chamber 10 so that the inner surface of each baffle 106 is closer to the chamber axis than its outer surface. Each of nozzles 107 is connected with a separate conduit 104 and is adapted to admit liquid tangentially upon the inner surfaces of a separate curved baffle 106 as a wide shallow stream. End closure 23 of chamber 10 forms a bottom side of section 19. Conduit 108 is positioned in closure member 23 and is in communication with a lowermost portion of section 19.

Figure 2 is illustrative of the curved baffles in each of the chamber sections above described, by way of cut away 2—2 of Figure 1 specifically illustrating one such set of baffles, i. e., baffles 24. Figure 2 is further illustrative of the manner in which oil feed is tangentially introduced onto each of the curved baffles, in chamber 10, specifically illustrating nozzles 34 disposed to deliver liquid feed tangentially onto baffles 24, as a plurality of wide shallow streams. Curved baffles and the relative positions of nozzles and curved baffles in all of the chamber sections above described are the same as illustrated in Figure 2 with respect to baffles 24 and nozzles 34.

In a preferred embodiment of my invention, and as illustrated in the drawings, the curved baffles in each chamber section extend toward the interior of the respective section to points on a cylindrical space, or an imaginary cylinder therein, coaxial with chamber 10. In any case, each curved baffle is positioned so that its inner surface is closer to the chamber axis than its outer surface, so that the swirling upward motion of vapors through the chamber 10 will be maintained. Expressed in another way, the inner surface of each curved baffle in chamber 10 faces the chamber axis. In one form of my preferred apparatus embodiment, all curved baffles in chamber 10 are substantially the same size and shape.

Preferably each of the chimney conduits 38, 44, 46, 57, 83 and 97 in chamber 10 is cylindrical and has about the same diameter. The said cylindrical spaces when formed in each of sections 14, 16–19, and 21 preferably have about the same diameters.

The horizontal plates described in chamber 10 are preferably circular, and in any case extend entirely over the chimney conduit in closest proximity thereto, and preferably over the entire cylindrical space in the same chamber section therewith.

Clearance is provided between the end of each chimney conduit in chamber 10 and the horizontal baffle in closest proximity thereto so as not to obstruct vapor flow. Sufficient clearance is provided when its vertical dimension is equal to at least one-fourth the diameter of the specific chimney conduit. For example the vertical distance between the extended end of chimney conduit 38 in partition 37 and horizontal plate 39 is at least one-fourth the diameter of chimney conduit 38; and by way of further example, the vertical distance between horizontal plate 20 and the bottom of conduit 57 in partition 56 is at least one-fourth the diameter of conduit 57. Similarly, the annular space between the side wall of chamber 10 and each horizontal plate therein is regulated by maintaining the difference at such a point between the chamber diameter and the diameter of the horizontal plate so as not to obstruct vapor flow through chamber 10, or by maintaining the difference between the cross sectional area of the chamber and the horizontal plate equal at least to the cross sectional area of the chimney conduit associated therewith.

In Figure 3 is illustrated apparatus for effecting flash vaporization of residual oils in accordance with my invention. Chamber 10' is an upright elongated chamber, preferably cylindrical, and is closed at its top end by closure member 13' and at the bottom end by closure member 23'. Chamber 10' is transversely divided into two sections, 111 and 112 by partition 115. Vertically disposed baffle members 113 occupy a central portion of section 112 and extend from points on an outer periphery of chamber 10' in a common curved direction toward the interior of section 112, so that the inner surface of each baffle 113 is closer to the chamber 10' axis than the outer baffle surface, and preferably to points on a concentric cylindrical space in section 112 coaxial with chamber 10'. Oil feed inlet conduit 114 communicates with the interior of section 112 via heater 116, conduit 117, header 118 and inlet conduit 119 in a side wall of chamber 10'. Nozzles 121 in section 112 are each connected with separate conduits 119 and are adapted to each admit liquid tangentially onto the inner surfaces of a separate baffle 113 as a wide shallow stream. Outlet conduit 122 in a side wall of chamber 10' is in communication with a lowermost portion of section 112 and with outlet conduit 123 or recycle conduit 124, via pump 126. Recycle conduit 124 is connected with conduit 114 for recycle of residual oil to section 112.

Chimney conduit 126 extends through partition 115 and upwardly into section 111, and is coaxial with chamber 10'. Spray means 70' is positioned in a top portion of section 111 and is in communication with a lowermost portion of section 111 via conduit 127, cooler 128, conduit 129, pump 131, and conduit 132 in a side wall of chamber 10'. Conduit 133 is connected with conduit 132 via pump 131 for withdrawal of liquid from the system. Horizontal baffle 110, preferably circular, is positioned in section 112 intermediate the curved baffles therein and chimney conduit 126, and extends across chimney conduit 126. Horizontal baffle 134, preferably circular, is positioned in section 111 intermediate chimney conduit 126 and spray means 70' and extends across conduit 126. Conduit 126 is preferably cylindrical. Low pressure drop is maintained across chamber 10' by regulating clearances in the same manner as described with reference to the apparatus of Figure 1. Chamber 10' is maintained under subatmospheric pressure by vacuum producing means 11, through conduit 12, extending through closure 13'.

In the operation of a preferred embodiment of the process of my invention (see Figure 1), chamber 10 is maintained under an absolute pressure preferably as low as from 0.1 to 0.5 mm. Hg, by means of vacuum producing means 11, which in one form can be a system of steam jets operated to withdraw any uncondensed vapors from chamber 10 through conduit 12. Other vacuum producing means can be employed such as a vacuum pump or the like. A residual oil, as for example a topped crude residuum having a boiling range above at least 700° F., or a residuum from a topped crude recycle cracking operation, is introduced into the system illustrated in Figure 1, through conduit 29. Oil feed in conduit 29 is preheated to a desired temperature within the limits of generally 400 to 900° F. and introduced into header 36 directly, or if desired can be passed through heater 33 together with condensate from conduit 41 described hereafter, and introduced into section 16 via nozzles 34. In any event, preheated feed, and heated condensate from section 14, are introduced through conduits 28 and nozzles 34 into section 16 as a plurality of wide shallow streams tangentially against a plurality of vertically disposed surfaces therein comprising the inner wall surfaces of curved baffles 24. In this manner oil feed is spread as a thin liquid film on the inner surfaces of the curved baffles 24, which film is urged on the curved surfaces by centrifugal force, and liquid droplets that may be emitted from the film as it travels and vaporizes on the baffle surfaces are re-collected on the curved surfaces by virtue of the curvature, and further vaporized, or reduced. The liquid is thereby flash vaporized in a manner that prevents violent boiling or erupting of liquid, so that the vapors formed contain a minimum of entrained liquid. The unvaporized oil descends on the baffle surfaces to a lowermost portion of section 16. Unvaporized liquid in section 16 is collected in the bottom thereof by virtue of a reservoir formed by the side walls of chamber 10, partition 37, and the upward extending portion of chimney conduit 38 in section 16. Unvaporized liquid is withdrawn from section 16 through conduits 73 and pump 74 and heated in heater 76 to a temperature generally from about 50 to 150° F. higher than that of the temperature of the heated feed introduced into section 16 through conduits 28. Heated liquid is withdrawn from heater 76 through conduit 77 and discharged into header 78 and then through nozzles 81 via conduits 79. Liquid is discharged from nozzles 81 onto the curved inner surfaces of baffles 72 so as to form a thin liquid film in the same manner as discussed with respect to the introduction of liquids onto the curved baffles in section 16. In this manner the liquid ordinarily withdrawn as a residual flash vaporization product is instead further reduced in an additional flash vaporization stage. Vapors formed in section 17 contain a minimum of entrained liquids inasmuch as the vaporization taking place on the curved baffles in section 16 is not in any way violent, or otherwise of such a nature that minute droplets are discharged into the vapors. Instead, the vaporization proceeds at a relatively slow rate and liquid droplets that otherwise might pass directly into the vapors are re-collected on the baffles inner surfaces and further vaporized. Vapor is passed upward in section 17 and unvaporized liquid is passed downwardly and collected in a lowermost portion thereof. Partition 82 together with a side wall of chamber 10 and the upwardly extending portion of conduit 83 in section 17 form a reservoir for collection of liquid. Unvaporized liquid is withdrawn from section 17 through conduit 86 and pump 87, and heated in heater 88 to a temperature still higher than that effected in heater 76, generally from about 40 to 100° F. higher. Liquid thus heated in heater 88 is withdrawn through conduit 89 and discharged into header 91 to nozzles 93 via conduits 92. In section 18 liquid discharged from nozzles 93 is spread as a thin film on the inner surfaces of curved baffles 84 and further vaporization of liquid is conducted in the same manner as previously described in section 17, i. e., the vaporization in section 18 is regulated so that violent formation of vapors with resulting entrainment of liquid particles in vapors formed is prevented and instead the vaporization is gentle and the liquid droplets emitted upon the initial vaporization are re-collected on the baffle 84 surfaces and further vaporized so that vapors formed are substantially free of entrainment. Unvaporized liquid is collected in section 18 in the bottom portion thereof in the reservoir formed by partition 96, chimney conduit 97, and the chamber 10 side wall. Unvaporized liquid is withdrawn from section 18 and further vaporized in an additional flash vaporization stage by withdrawing same through line 98, pump 99, and heater 101 wherein it is further heated to a temperature of about 25 to 50° F. above that of the heated oil introduced into section 18 through conduits 92. Heated oil is withdrawn from heater 101 through conduits 102 and discharged into header 103 and nozzles 107 via conduit 104 onto the inner curved surfaces of baffle members 106 in section 19. The vaporization in chamber 19 is conducted in the same manner as described with respect to that taking place in sections 16, 17, and 18. Unvaporized residual liquid from the flash vaporization is collected in the bottom of section 19 and withdrawn therefrom through residual product outlet conduit 108.

Vapors are passed upwardly from section 19 into section 18 against horizontal baffle 94, being thereby directed to an outer extremity of section 18 and then upwardly along the curved surfaces therein toward chimney conduit 83. In this manner vapors are passed upwardly from an outer extremity of section 18 along a curved or spiral-like path and are caused to move in a swirling motion as they approach chimney conduit 83. By such motion, at least a major part of any remaining entrained liquid is "thrown out" of the vapor by centrifugal force so that the vapors rising from conduit 83 are substantially free of entrained liquid. Vapors formed on the baffle surfaces in section 18 are of course carried along spirally out of section 18 through conduit 83 with vapors from section 19. Similarly vapors passing upwardly through chimney conduit 83 into section 17 are deflected by baffle 75 toward an outer extremity of section 17, and pass upwardly in section 17 along the curved baffle surfaces therein toward chimney conduit 38 thereby moving along a spiral-like path. Total vapors move upwardly from section 17 through chimney conduit 38 in a swirling motion thereby freeing or throwing out entrained liquid, particularly that from vapors originating in section 17. In a similar manner vapors passing upwardly through chimney conduit 38 into section 16 are deflected to an outer extremity of section 16 and upwardly therein along the curved baffle surfaces 24 toward chimney conduit 44. Total vapors entering chimney conduit 44 are those formed in each of the flash vaporization sections 16, 17, 18, and 19 and which have been freed of entrained liquid droplets in each section by virtue of the flash vaporization of liquid on the baffle surfaces as described, and then by the upward flow of vapors through the respective sections along the curved baffle surfaces in a swirling-like manner to "throw out" remaining entrained liquid particles by centrifugal force, such thrown out particles being re-collected on the baffle surfaces and vaporized further, or if not further vaporized, being carried on down in the chamber 10 to a lower flash vaporization section 19.

In sections 14 and 21 fractionation of vapors and liquids takes place on relatively cool baffle surfaces, on each of which a cooled liquid condensate described hereafter is spread as a thin liquid film in a manner the same as described with respect to spreading of liquid on baffle surfaces in each of the flash vaporization sections.

Condensate described hereafter is withdrawn from section 21 through line 47 and pump 48 and passed into cooler 49 and cooled therein to a temperature of from 50 to 125° F. lower than that of vapors passing upwardly through chimney conduit 44. Cooled condensate is discharged from cooler 49 into section 14 through conduit 51, header 52, conduits 53 and nozzles 59, and is admitted tangentially onto the inner curved surfaces of baffles 42 as a plurality of wide shallow streams and travels in a downward direction toward the bottom of section 14 on the curved surfaces. Vapors passed upwardly through chimney conduit 44 are caused by baffle 54 to tend to move in a direction toward an outer and upper extremity of section 14. In this manner upwardly flowing vapors contact a cooler liquid film on the curved baffle inner surfaces in a countercurrent flow relation, thereby causing heavier fractions of the vapor to be cooled and to condense, and lighter fractions of the liquid to be vaporized. During the time that vapor-liquid contact is effected in the manner described, a true fractionation is taking place so that the heavier components of vapor are condensed and move on downwardly toward the section 19 in chamber 10, while at the same time light and valuable components of the liquid condensate are separated and passed as vapors upward from section 14. Total unvaporized liquid is collected in the bottom of section 14 by means of a reservoir formed by partition 43, a chamber 10 side wall, and the upwardly extending portion of conduit 44 in section 14. Condensate is withdrawn from section 14 through conduit 41 and pump 45 and heated in heater 33 and introduced into section 16 together with fresh feed from conduit 29, as described hereinbefore. Total vapors are passed from section 14 upwardly into section 21 through chimney conduit 46 and are further fractionally condensed in contact with a thin film of relatively cool condensate to provide for condensation of heavy components in the vapor and vaporization of lighter components in the liquid contacted. Condensate from section 22 as described hereafter is introduced through conduit 62, header 63, and conduits 64 via nozzles 66 tangentially onto the curved inner surfaces of baffles 67 in section 21 being spread thereon as a thin liquid film. Vapors rising into section 21 through conduit 46 are caused by baffle 20 to tend to flow in a direction toward an upper outer extremity of section 21. Accordingly vapors must travel along the curved baffle inner surfaces in section 21, thereby contacting in countercurrent flow relation a downwardly flowing cool liquid film to effect further fractional condensation of vapors and vaporization of liquid thus introduced into section 21. Total condensate is collected in the bottom of section 21 in a reservoir formed by partition 152, an upper portion of chimney conduit 46 and a chamber 10 side wall. Condensate is withdrawn from section 21 for return to section 14 as described. Condensate introduced into section 21 on the curved baffle inner surfaces therein is generally sufficiently cool so that further cooling is unnecessary. It is generally desired that the condensate introduced through nozzles 66 be at a temperature of from 125 to 200° F. lower than that of vapors emerging through chimney conduit 46.

Total vapors rise from section 21 through chimney conduit 57 into section 22 wherein total condensation is effected. Total condensate is collected in the bottom of section 22 in a reservoir formed by partition 56, a chamber 10 side wall, and an upward extending portion of conduit 57. Condensate is withdrawn from section 22 through conduit 58 and pump 59 and then divided into three portions. A first portion is generally sufficiently cool that it can be introduced through nozzles 66 into section 21 as already described. A second portion is passed from conduit 61 via conduit 69 into cooler 68 where it is cooled to a temperature as low as from 200 to 400° F. lower than vapors emerging from chimney conduit 57 and then introduced into an upper portion of section 22 via conduit 67 by spray nozzle means 70, and dispersed in a downward direction in section 22 as a finely divided spray to contact warmer vapors in heat exchange relation so as to condense them. A remaining portion of condensate withdrawn from section 22 is recovered through conduit 151 as a high-quality distillate product of the process of my invention. Passage of liquid downwardly through chimney conduit 57 is prevented by means of horizontal baffle 71, the latter deflecting any downwardly flowing liquid in section 22 in a direction to be collected in a bottom portion thereof.

In Figure 3 I have illustrated process and apparatus by means of which a simple flash vaporization of a heavy oil of the type charged to the apparatus of Figure 1, can be carried out so that the vapors produced are freed of entrained liquid droplets and have utility as feed stock to various hydrocarbon conversion processes, and whereby substantially all heavy asphaltic constituents and other undesirable residual materials are retained in the residual portion of the flashed feed. In the operation of the embodiment of Figure 3, residual oil feed from conduit 114 is heated in heater 116 and introduced into section 112 through conduit 117, header 118, conduits 119, and nozzles 121 each connected with a separate conduit 119 and adapted to tangentially introduce the heated oil as a plurality of wide shallow streams onto the curved inner surfaces of baffles 113. In this manner liquid from nozzles 121 is spread as a thin film on each of the curved baffle inner surfaces. The vaporizing liquid film is urged to the baffle inner wall by centrifugal force and liquid drops "thrown out" by the boiling are re-collected on the curved wall so that liquid particles otherwise carried from the flash vaporization zone as entrained liquids are caused to be re-vaporized, thereby reducing or substantially preventing appearance of entrained liquid particles in the vapors produced. At the same time the spreading of the liquid film prevents "explosive" boiling or other violent action ordinarily resulting from the sudden introduction of the liquid into the zone of reduced pressure. Accordingly the formation of tarmist from a portion of the unvaporized liquid into entrainment of same in the vapors formed is substantially prevented in section 112. Unvaporized liquid is caused to pass downwardly in section 112 along the curved baffle inner surfaces and is collected in the bottom thereof. Vapors substantially free of entrained heavy liquids and other undesirable residual constituents of the feed are caused to move upwardly in section 112 along the curved baffles and inwardly toward chimney conduit 126 thereby moving in a swirling manner to "throw out" remaining liquid particles entrained therein, which particles are moved downwardly in section 112 and re-vaporized or are recovered with residual liquid. Vapors substantially free of entrained liquid are passed upwardly through chimney conduit 126 into section 111 wherein they are totally condensed. Total condensation can be conducted in any manner desired. I prefer to withdraw condensate formed from a lower portion of section 111 through conduit 132 and pump 131, and to cool a portion of same in cooler 128 to a temperature of from 100 to 400° F. lower than from vapors rising from conduit 126 and then to pass the cooled condensate to spray nozzle means 70' via conduit 127 and to eject the cooled liquid as a spray in an upper portion of section 111 in direct heat exchange relation with warmer vapors to be condensed. However, it is to be understood that any desired means for effecting the exchange relation and condensation in section 111 can be employed if desired. High-quality liquid distillate is withdrawn from section 111 through line 133 as a product of the process, and is free from minerals, salt, and virtually all the asphaltic constituents in the oil feed, these constituents having been concentrated in the bottoms product. Residual unvaporized liquid is collected in the bottom of section 112 and is withdrawn through conduit 122, pump 126, and conduit 123, or recycled in any desired proportion to chamber 10' via conduit 124.

With reference to Figure 4, one form of nozzle that can be utilized in the practice of my invention to direct a wide shallow stream of oil onto a curved baffle inner surface is illustrated. The discharge end portion 141 of the nozzle is relatively long and of very narrow width so as to cause a pressure drop to be developed, that is required to maintain pressure during heating or cooling as the case may be, at a level substantially above that employed in the distillation chamber, preferably from about 300 mm. Hg. abs. to atmospheric. The length 140 of the discharge end portion 141 of the nozzle is preferably equal to from ¼ to ¾ the vertical height of the curved baffle associated therewith. Preferably the length 140 is disposed in parallel relation with the axis of the curved baffles so as to efficiently effect tangential addition of the liquid as a thin film onto the baffle inner surfaces.

It is preferred that baffles in all sections of chambers 10 or 10' be of the same vertical height, and that all baffles in any one section be also the same height, although these dimensions can be altered if desired.

For convenience and clarity, certain apparatus such as pumps, valves, accumulators, and surge tanks have not been shown in the drawings. Obviously such modifications of the present invention may be practiced without departing from the scope of the invention.

My invention provides for carrying out the vacuum distillation of residual oils, particularly petroleum residues, under distillation pressures as low as from 0.1 to 2 mm. as desired. This is made possible by virtue of carrying out the process without the need for packing materials of any kind, or other obstructing structure in the chamber, as for example one or more bubble-cap trays, liquid layers on such a tray, or the like. Instead, flash vaporization alone or in conjunction with further fractionation of the vapors so-produced is carried out while passing the vapors in contact with liquid along a free unobstructed path through the distillation chamber.

In the preferred practice of the embodiment of my invention, illustrated in Figure 1, I generally vaporize from 20 to 40 per cent by volume of unvaporized liquid introduced into each of the first, second, third, and fourth sections. In such preferred practice the residual liquid withdrawn from the fourth chamber section comprises from 20 to 30 per cent by volume of the residual oil introduced into the system as fresh feed.

By way of example herein, a reduced crude having the properties tabulated hereinbelow is charged to a vacuum distillation system of my invention of the kind illustrated in Figure 1 of the drawings. The feed is passed in admixture with heated condensate from section 14 into section 16 at an inlet admixture temperature of 455° F. The flash vaporization is carried out initially in section 16 and in remaining flash vaporization sections 17, 18, and 19 thereby employing a four stage flash vaporization operation in a gentle manner so as to avoid "explosive" boiling and entrainment of liquid in the vapors formed. In this manner about 30 per cent of the unvaporized liquid fed to each stage is vaporized.

Total vapors from each flashing stage, i. e., in sections 16, 17, 18, and 19, emerge toward upper sections 14, 21, and 22 through conduit 44. True fractionation of vapor and liquids takes place in sections 14 and 21. By cooling the condensate as required for carrying out the fractionation in sections 14 and 21, and by heating condensate as described herein to be introduced into each of the lower flash vaporization sections, I have provided a forced approach to equilibrium, i. e., the use of deliberate heating and cooling to overcome the inherently poor contacting between a heavy liquid and a vapor under high vacuum conditions. In the sections 14 and 21, forced contacting of vapors and liquid is achieved, resulting in true fractionation, since a cooler liquid is spread uniformly on the baffle inner surfaces, to force a "refluxing" action and thus produce an improved separation over that obtained by conventional flash distillation of such an oil.

Heating in stages as illustrated is carried on in heaters 33, 76, 88, and 101 employing any desired heat exchange system. However, I have found it advantageous to use "Dowtherm" as a heating medium. If desired, the Dowtherm boiler can be fired directly with the hot bottoms product from chamber 10.

Liquid is withdrawn from section 16 and introduced into section 17 at 535° F.; from section 17 and introduced into section 18 at 585° F.; and is withdrawn from section 18 and introduced into section 19 at 630° F. Residue is withdrawn from the bottom of section 19 at about 620° F. Condensate is withdrawn from section 21, cooled and returned to section 14 at 380° F.; and is withdrawn from section 22 and returned into section 21 at its existing temperature which is about 200° F. Condensate is cooled in cooler 68 and returned to section 22 as the sprayed heat exchange liquid at about 100° F. Under these conditions the distillation chamber is maintained at an absolute pressure of about 0.4 mm. Hg. The following tabulation is descriptive of the specific reduced crude feed illustrated, the high-quality distillate product obtained, and the distillation bottoms product, together with certain physical characteristics of these materials:

|  | Feed | Distillate | Bottoms |
|---|---|---|---|
| Volume percent based on Crude | 47 | 35.6 | 11.4 |
| Volume percent based on Residual Feed | 100 | 76 | 24 |
| Gravity °API | 21.2 | 27.5 | 9.8 |
| Distillation: | | | |
| Initial Boiling Point | 700 | 700 | |
| 5 | 722 | 720 | |
| 10 | 741 | 740 | |
| 20 | 782 | 763 | |
| 30 | 828 | 805 | |
| 40 | 875 | 842 | |
| 50 | 924 | 876 | |
| 60 | 985 | 917 | |
| 70 | 1,050 | 956 | |
| 80 | | 998 | |
| 90 | | 1,068 | |
| End Point | | | |
| Pour Point, F | +90 | +105 | |
| Viscosity: | | | |
| SFS @ 122° F | 70 | | |
| SUV @ 210° F | | 50.1 | |
| Sulfur, weight percent | 0.33 | 0.26 | 0.53 |
| Conradson Carbon Residue | 5.95 | 0.1 | 23.7 |
| Ash, weight percent | 0.01 | 0.00 | 0.09 |

It is clear from the foregoing example that the distillate product obtained is valuable as a charging stock to various hydrocarbon conversion processes by virtue of its low carbon residue, its freedom from ash, and relatively low pour point. It is such distillate that is particularly applicable as a feed stock for hydrocarbon cracking to produce olefins and aromatics in high yield. It is further illustrated in Example 1 that the mineral and salt "ash" and virtually all the asphaltic constituents present in the reduced crude feed are concentrated in the bottoms of the column to provide a clean overhead distillate product.

In the general practice of my invention as applied to residual hydrocarbon oils having a boiling range above about 700° F., the carbon residue (Conradson) of the distillate product is generally below 0.3 and of the unvaporized bottoms product is generally above 20.0.

As will be evident to those skilled in the art, various modifications can be made or followed, in the light of the foregoing disclosure and discussion, without departing from the spirit or scope of the disclosure or from the scope of the claims.

I claim:

1. Apparatus for flash vaporizing a residual oil comprising a closed upright elongated chamber; means for maintaining said chamber under sub-atmospheric pressure; a partition in said chamber transversely closing same so as to divide said chamber into an upper and a lower section; a chimney conduit in said partition extending into said upper section and coaxial with said chamber; spray nozzle means in an upper portion of said upper section; conduit means in communication with a lower portion of said upper section and with said spray means, and means for pumping and cooling liquid to be passed through the last said conduit; an outlet conduit in a side wall of said chamber in communication with a lower portion of said upper section; an outlet conduit in a side wall of said chamber in communication with a lower portion of said lower section; a plurality of vertically disposed baffles in a central portion of said lower section curved in a common direction and extending laterally from the periphery of said chamber toward the interior of said lower section so that the inner surface of each baffle of said plurality is closer to the chamber axis than the outer surface of said baffle; liquid inlet means in a side wall of said chamber in communication with said lower section, and nozzle means in said lower section connected with said liquid inlet means and adapted to tangentially admit liquid from said liquid inlet onto inner surfaces of each said curved baffles; a horizontal baffle in said lower section intermediate said curved baffles and said partition and extending over the inner ends of said baffles; and a horizontal baffle in a lower portion of said upper section, extending over said chimney conduit.

2. Vacuum distillation apparatus comprising, in combination: a distillation chamber; means for producing and maintaining a vacuum in said chamber; a partition member dividing said chamber into an upper and a lower section; means for withdrawing liquid from the upper surface of said member; means for transferring the withdrawn liquid onto a surface of a curved baffle in said lower section as subsequently described; chimney means in said partition member; vertically disposed curved baffle means attached, at one end, to the inner wall of said chamber in said lower section and curved and otherwise adapted to direct liquid along a curved path in a direction from the periphery of said chamber toward the axis of said chamber; nozzle means, included in the transferring means, for introducing liquid onto the inner surfaces of said baffle means and causing it flow in the direction aforementioned; horizontally disposed baffle means positioned above said chimney means, adapted to prevent downward flow of liquid into said chimney means; means for introducing liquid into the top portion of said upper section above said horizontally disposed baffle means; means for withdrawing vapor from said chamber; means for introducing feed into said chamber; and means for withdrawing liquid from said chamber.

3. In a distillation apparatus, the improvement comprising, in combination: a distillation chamber; means for withdrawing vapor from an upper part of said chamber; means for withdrawing liquid from a lower part of said chamber; a vertically disposed convolute baffle positioned in said chamber; and nozzle means for directing liquid, in the form of a thin film, along an inner surface of said baffle from the periphery toward the axis of said chamber.

4. In a vacuum distillation apparatus comprising an upright column provided with a plurality of transverse annular partitions, each having a central chimney, said partitions dividing said column into a plurality of sections, the improvement comprising, in combination: a plurality of curved, vertical baffles positioned in each of said sections except the uppermost section, each of said baffles being attached at only one of its ends to the wall of said column and extending spirally inwardly and terminating at a locus adjacent the axis of said column, the inner surface of each of said baffles facing toward said axis; a plurality of nozzles adjacent said wall, each nozzle being positioned to direct liquid against and along the inner surface of one of said curved baffles toward said locus; a horizontal baffle positioned above each of said chimneys to prevent downward flow of liquid thereinto; conduit and pump means for transferring liquid from the upper surface of each of said partitions to the nozzles in the next lower section; a feed conduit in communication with the nozzles in at least one of said sections; and spray means for introducing reflux into the upper part of the uppermost of said sections.

References Cited in the file of this patent

UNITED STATES PATENTS

| Number | Name | Date |
|---|---|---|
| 1,316,770 | Corthesy | Sept. 23, 1919 |
| 2,028,340 | Lewis | Jan. 21, 1936 |
| 2,050,329 | Johnson, Jr. | Aug. 11, 1936 |
| 2,479,108 | Gerhold | Aug. 16, 1949 |
| 2,509,172 | Schreier et al. | May 23, 1950 |